US010650118B2

(12) United States Patent
Srinivasan et al.

(10) Patent No.: US 10,650,118 B2
(45) Date of Patent: May 12, 2020

(54) AUTHENTICATION-BASED PRESENTATION OF VIRTUAL CONTENT

(71) Applicant: MICROSOFT TECHNOLOGY LICENSING, LLC, Redmond, WA (US)

(72) Inventors: Vidya Srinivasan, Issaquah, WA (US); Andrew John Howe, Sammamish, WA (US); Harold Anthony Martinez Molina, Redmond, WA (US); Justin Chung-Ting Lam, Bellevue, WA (US); Edward Boyle Averett, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/971,663

(22) Filed: May 4, 2018

(65) Prior Publication Data
US 2019/0340333 A1    Nov. 7, 2019

(51) Int. Cl.
*G06T 15/08*    (2011.01)
*G06F 21/10*    (2013.01)
(Continued)

(52) U.S. Cl.
CPC .............. *G06F 21/10* (2013.01); *G06F 9/547* (2013.01); *G06F 21/6218* (2013.01);
(Continued)

(58) Field of Classification Search
None
See application file for complete search history.

(56) References Cited

U.S. PATENT DOCUMENTS 9,056,248 B2    6/2015 Alewine et al.
9,077,758 B1    7/2015 McGovern et al.
(Continued)

FOREIGN PATENT DOCUMENTS

WO    2016187348 A1    11/2016

OTHER PUBLICATIONS

"Placing Virtual Objects in Augmented Reality", Retrieved From https://github.com/gao0122/ARKit-Example-by-Apple, Retrieved on: Mar. 23, 2018, 3 Pages.
(Continued)

*Primary Examiner* — Andrew G Yang
(74) *Attorney, Agent, or Firm* — Newport IP, LLC; Jacob P. Rohwer

(57) ABSTRACT

The disclosed techniques enable virtual content displayed in an experience to be restricted and/or tailored based on a user identification. User information (e.g., login name, authentication credentials such as a password or biometric data, etc.) can be used to determine and/or authenticate an identification of a user that enters and/or consumes an experience via a head-mounted display device or another computing device connected to a head-mounted display device. The user identification can be used to determine which virtual content is displayed to the user as part of an experience. Consequently, different users that enter the same experience can be presented with different virtual content. This enables a creator of the experience to restrict the viewing of confidential and/or sensitive information. This also enables the creator of the experience to tailor or customize the virtual content that is displayed to each user that enters and/or consumes the experience.

7 Claims, 9 Drawing Sheets

(51) Int. Cl.
*G06F 9/54* (2006.01)
*G06F 21/62* (2013.01)
*G09G 3/00* (2006.01)
*H04L 29/06* (2006.01)

(52) U.S. Cl.
CPC ............. *G06T 15/08* (2013.01); *G09G 3/003* (2013.01); *H04L 63/08* (2013.01); *H04L 63/102* (2013.01); *H04L 63/104* (2013.01); *G06F 2221/0748* (2013.01); *G06T 2200/04* (2013.01); *G06T 2210/04* (2013.01)

(56) References Cited

U.S. PATENT DOCUMENTS

| | | | |
|---|---|---|---|
| 9,092,600 B2 | 7/2015 | Scavezze et al. | |
| 9,779,554 B2 | 10/2017 | Stafford et al. | |
| 10,403,050 B1* | 9/2019 | Beall | G06T 7/292 |
| 2007/0073673 A1* | 3/2007 | McVeigh | G06F 17/30233 |
| 2007/0242066 A1* | 10/2007 | Levy Rosenthal | H04N 5/272 |
| | | | 345/419 |
| 2010/0060662 A1* | 3/2010 | Law | A63F 13/10 |
| | | | 345/629 |
| 2012/0038667 A1* | 2/2012 | Branson | G09G 5/12 |
| | | | 345/632 |
| 2013/0083007 A1* | 4/2013 | Geisner | G06T 19/006 |
| | | | 345/419 |
| 2013/0307856 A1* | 11/2013 | Keane | G10L 21/10 |
| | | | 345/473 |
| 2013/0342564 A1* | 12/2013 | Kinnebrew | G09G 3/003 |
| | | | 345/619 |
| 2014/0125574 A1 | 5/2014 | Scavezze et al. | |
| 2014/0129336 A1* | 5/2014 | Bailey | G06Q 30/0261 |
| | | | 705/14.58 |
| 2014/0368537 A1* | 12/2014 | Salter | G06T 19/006 |
| | | | 345/633 |
| 2015/0304790 A1* | 10/2015 | Yamashita | G06F 21/32 |
| | | | 381/303 |
| 2016/0093108 A1* | 3/2016 | Mao | A63F 13/42 |
| | | | 345/633 |
| 2017/0039770 A1* | 2/2017 | Lanier | G06T 19/006 |
| 2017/0123750 A1* | 5/2017 | Todasco | G06F 3/1454 |
| 2017/0162177 A1 | 6/2017 | Lebeck et al. | |
| 2017/0337352 A1 | 11/2017 | Williams | |
| 2018/0174363 A1* | 6/2018 | VanBlon | G06T 19/006 |
| 2018/0204385 A1* | 7/2018 | Sarangdhar | G06F 3/0484 |
| 2018/0240275 A1* | 8/2018 | Clements | G06Q 50/26 |

OTHER PUBLICATIONS

Lebeck, et al., "Securing Augmented Reality Output", In Proceedings of 38th IEEE Symposium on Security and Privacy, May 22, 2017, pp. 1-18.

Minotti, Mike, "How virtual reality can change the future of user-generated content", Retrieved From https://venturebeat.com/2016/09/11/how-virtual-reality-can-change-the-future-of-user-generated-content/, Sep. 11, 2016, 5 Pages.

"International Search Report and Written Opinion Issued in PCT Application No. PCT/US19/029246", dated Aug. 7, 2019, 12 Pages.

* cited by examiner

AUTHENTICATION-BASED PRESENTATION OF VIRTUAL CONTENT

BACKGROUND

As use of head-mounted display devices becomes more prevalent, an increasing number of users can participate in an experience in which content is displayed via augmented reality techniques, mixed reality techniques, and/or virtual reality techniques. Furthermore, more and more people are creating these experiences for a particular purpose (e.g., an employee training experience for new employee training, a marketing experience for potential purchasers of a service such as a vacation or an item such as a pair of skis, etc.).

Conventional systems enable an experience to be consumed via a head-mounted display device that is configured to display content in a three-dimensional immersive environment. However, these conventional systems do not allow an author or a creator of the experience to restrict and/or to tailor the presentation of the content based on user identification. Rather, when multiple different users access the same experience, these conventional systems present the same content to the different users regardless of their identifications.

SUMMARY

The techniques described herein enable content displayed in an experience to be restricted and/or tailored based on a user identification. User information (e.g., login name, authentication credentials such as a password or biometric data, etc.) can be used to determine and/or authenticate an identification of a user (may be referred to herein as a "user identification") that enters and/or consumes an experience via a head-mounted display device or another computing device connected to a head-mounted display device. The user identification can be used to determine which content is displayed to the user as part of an experience. Consequently, different users that enter the same experience can be presented with different content. This enables a creator (e.g., an author) of the experience to restrict the viewing of confidential and/or sensitive information. This also enables the creator of the experience to tailor or customize the content that is displayed to each user that enters and/or consumes the experience.

As used herein, an experience can include two-dimensional scenes and/or three-dimensional scenes. Generally, an experience includes related and/or linked content that can be accessed and/or displayed for a particular purpose. The content in an individual three-dimensional scene can comprise a collection of different two-dimensional and/or three-dimensional objects. For example, a creator of an experience that authors a three-dimensional scene may start with a background template for the three-dimensional scene and then access a library of objects to select different objects to be added to the background template to complete the three-dimensional scene for the experience. In some instances, the creator may design his or her own objects to be added to the background template to complete the three-dimensional scene.

In some implementations, a user can consume an experience using two devices. For instance, a user may initially access an experience hosted over a network using a Web browser or an application of a computing device (e.g., a laptop computing device, a desktop computing device, a tablet computing device, a smartphone computing device, etc.). The experience can include multiple three-dimensional scenes configured to display content that is accessible via one or more network locations such as a Web page, for example. The user can switch from consuming the experience on the computing device to consuming the experience on a head-mounted display device that is in some way connected to the computing device. For instance, the connection can comprise a wired and/or wireless Universal Serial Bus (USB) connection, a BLUETOOTH connection, a Wi-Fi connection, or another type of connection. In alternative implementations, a user can access and consume the experience using a single device such as a head-mounted display device.

In a more specific example and to further illustrate, an experience can include company content an employer wants a new employee to know, to be informed about, or to learn, and thus, the new employee can access the experience, from a network location (e.g., an Intranet page), when he or she starts a new job. In various examples, an experience can include one or more spaces. A space comprises a segment or type of content within the broader experience. Continuing the example from above, one space can include company content that relates to job training for a new employee, while another space in the same experience can include company content related to different interest and activity groups for which the employer provides a budget (e.g., a hiking group, a skiing group, a chess group, a religious study group, etc.). This example shows how the two types of content relate to a situation where a new employee is beginning employment with a company, yet the types of content are different and therefore different spaces can be part of a broader experience.

In various implementations described herein, an identification of a user consuming an experience can be received and/or verified. When viewing a three-dimensional scene in the experience, the user identification can be compared to information that defines user permissions associated with objects in the three-dimensional scene that have been designated for restriction. The user permissions indicate whether a user is allowed to view content of an object or is restricted from viewing the content of the object when consuming the three-dimensional scene. Accordingly, different users that consume the same three-dimensional scene authored for the same experience are presented with different content. That is, a first user may be allowed to view content of a first object in the three-dimensional scene while a second user is restricted from viewing the content of the first object. In contrast, the second user may be allowed to view content of a second object in the three-dimensional scene while the first user is restricted from viewing the content of the second object.

In various examples, the user identification can be compared to a list of user identifications associated with an object that is designated for restricted viewing. If the user identification is included on the list of user identifications, then the user is authorized to view the content of the object (e.g., the list is an "authorized" list of user identifications). For instance, the list can be an access control list maintained in association with the object by a network provider (e.g., a content or service provider that stores the object data). In other examples, if the user identification is included on the list of user identifications, then the user is not authorized to view the content of the object (e.g., the list is a "prohibited" list of user identifications). In even further examples, a level of authentication associated with the user identification (e.g., based on a class of an employee, a type of customer, etc.) can be compared to a threshold level of authentication associated with the object or some sort of predefined condition for authorization. If the level of authentication associated with the user satisfies the threshold level of authentication or the predefined condition, then the user is authorized to view the content of the object.

The information that defines the user permissions can be metadata associated with an object. The information can be accessed using a widget associated with an object. A widget comprises information useable to access and display content such as an object. Thus, the widget can be embedded in, or part of, a three-dimensional scene. As part of the rendering process of the three-dimensional scene, a head-mounted display device or a device connected to the head-mounted display device can use the widget to retrieve data useable to render and display the content of the object. Moreover, the widget can be used to retrieve the metadata that defines user permissions. In one example, a widget can comprise a uniform resource locator (URL).

In various examples, the user identification and/or the information that defines the user permissions can be accessed via an application programming interface (API) call to a service or an application configured to access the information that defines the user permissions. That is, when rendering the three-dimensional scene, a head-mounted display device or a device connected to the head-mounted display device can determine that an object is a restricted object. The object, or the widget associated with the object, can include data that indicates the object is a restricted object. Moreover, the object, or the widget associated with the object, can include data that indicates an owner of the object. Accordingly, the API call can be used to retrieve the user permissions from the owner of the object.

In this context of this disclosure, the owner of the object can be a provider and/or a network location (e.g., a URL) that stores the data of the object (e.g., the content of the object). The owner of the object can be a designer of the object. Or the owner of the object can be a creator of the three-dimensional scene. The head-mounted display device or a device connected to the head-mounted display device can be configured to provide an option for a viewing user to request permission to view content of a restricted object. In this scenario, the user may see graphical data that indicates the object exists, but the object has not been populated with its content because the user is not authorized to view the content. The head-mounted display device or a device connected to the head-mounted display device can receive user input that selects the option, and based on receiving the user input, the head-mounted display device or a device connected to the head-mounted display device can be configured to send a request to an owner of the object for user permission to view the content of the object.

In additional implementations described herein, after receiving and/or verifying an identification of a user consuming an experience, the user identification can be used to populate an object in the three-dimensional scene with tailored content. For instance, the object can comprise information that maps user identities to different content useable to populate the object. That is, a first user identification can be associated with first content for the object, a second user identification can be associated with a second content for the object, and so forth. In a more specific example, the object can comprise a frame on a wall that is configured to list individual performance metrics for employees. At a time when a three-dimensional scene is rendered for display, a widget associated with the object can reference and retrieve a specific performance report for an employee so that the employee sees his or her own report and not the performance reports of other employees. Accordingly, different users that consume the same three-dimensional scene authored for the same experience are presented with different content.

In some examples, a user identification can be associated with a category or a class of users (e.g., a new "engineering" employee, a new "sales" employee, a new "information technology" employee, etc.) and a widget useable to access the tailored content can be used for the category or class of users. Thus, users in the same category or class can be presented with the same content while users in different categories or classes can be presented with different content.

In even further implementations described herein, after receiving and/or verifying an identification of a user consuming an experience, the user identification can be used to navigate from a current three-dimensional scene to a next three-dimensional scene. Here, the next three-dimensional scene may be identified and/or selected from a plurality of available next three-dimensional scenes. Consequently, based on different user identifications, different navigation paths in the same experience can be encountered. A navigation path comprises a sequence or an order of three-dimensional scenes that are rendered and displayed.

In various examples, user input to navigate, or switch, from one three-dimensional scene to the next can be based on an interaction with a displayed object. For instance, the user may employ a controlling mechanism, a gesture, a voice command, and/or user motion to select (e.g., click on, touch, walk through, etc.) the displayed object. The displayed object, in this example, can serve as a link between three-dimensional scenes. Accordingly, a display of the head-mounted display device may fade out of a currently displayed three-dimensional scene and fade into a newly displayed three-dimensional scene based on the user input.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

DETAILED DESCRIPTION

The techniques described herein enable content displayed in an experience to be restricted and/or tailored based on a user identification. User information (e.g., login name, authentication credentials such as a password or biometric data, etc.) can be used to determine and/or authenticate an identification of a user that enters and/or consumes an experience via a head-mounted display device or another computing device connected to a head-mounted display device. The user identification can be used to determine which content is displayed to the user as part of an experience. Consequently, different users that enter the same experience can be presented with different content. This enables a creator of the experience to restrict the viewing of confidential and/or sensitive information. This also enables the creator of the experience to tailor or customize the content that is displayed to each user that enters and/or consumes the experience.

Various examples, scenarios, and aspects are described below with reference to FIGS. 1-9.

Figure 1:
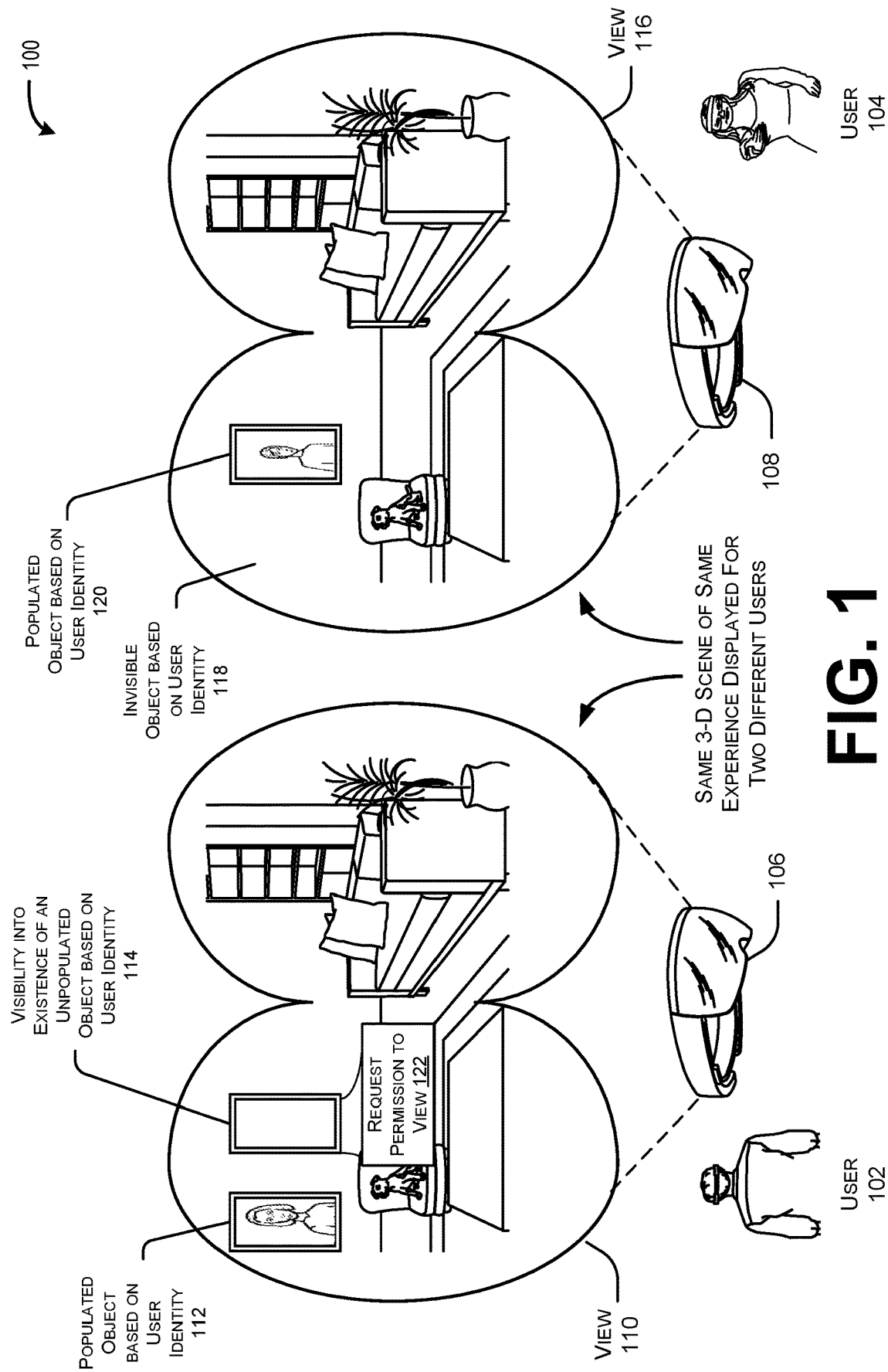
FIG. 1 is a diagram illustrating an example of how different users that enter a same experience and consume a same three-dimensional scene using respective head-mounted display devices are presented with different content based on their user identities and different user permissions.

FIG. 1 is a diagram 100 illustrating an example of how different users (e.g., a first user 102 and a second user 104) that enter a same experience and consume a same three-dimensional scene in the experience using respective head-mounted display devices 106, 108 are presented with different content based on their user identities and different user permissions. The example three-dimensional scene in the diagram 100 of FIG. 1 includes a background template of a living room (e.g., walls, a floor, a couch, a chair, a coffee table, a book case, etc.). Moreover, a creator of the example three-dimensional scene has added objects to complete the three-dimensional scene. These objects include a plant, a dog, and two wall frames. The plant and the dog are objects that have not been designated as restricted objects based on user identities, and thus, the content of these objects is viewable by any user (e.g., user 102 and/or user 104) that consumes the three-dimensional scene illustrated in FIG. 1. However, the two wall frames are displayed differently for user 102 and user 104, and thus, these objects have been designated as restricted objects (e.g., by the designer of the objects, by the creator of the three-dimensional scene, etc.).

In a view 110 of the three-dimensional scene provided by a display of the head-mounted display device 106 to user 102, a first wall frame on the left of the room wall is populated with content such as an image of a person. The person and/or a position of the person within an organization may be sensitive and/or confidential information to which some people likely to consume the three-dimensional scene are not privy. Thus, the first wall frame on the left of the room wall comprises an object that has been designated as a restricted object. In the view 110, this object has been populated with content (e.g., the image of the person) based on an identity 112 of user 102. For example, an identity of the user 102 may be included on a list of users that have permission to view the image of the person. In another example, an identity of the user 102 may be mapped to a level of authentication that satisfies a threshold level of authentication associated with the object (e.g., user 102 may be an employee with a position that satisfies certain qualifications or experience).

Furthermore, in the view 110 of the three-dimensional scene provided by the display of the head-mounted display device 106 to user 102, a second wall frame on the right of the room wall is not populated with content. The second wall frame on the right of the room wall also comprises an object that has been designated as a restricted object. However, visibility into an existence, or presence, of the unpopulated second wall frame 114 is provided. That is, the head-mounted display device 106 renders and displays graphical data to indicate the object exists, but the object is not populated with content that is restricted. In this way, the user 102 may know or deduce that the three-dimensional scene includes additional content which he or she is unable to view. Thus, the second wall frame on the right of the room wall comprises an object that is not populated based on an identity of user 102.

In contrast, in a view 116 of the three-dimensional scene provided by a display of the head-mounted display device 108 to user 104, visibility into the existence of the first wall frame on the left of the room wall is not provided 118 based on an identity of user 104. Thus, the first wall frame on the left of the room wall comprises not only an object that is not populated based on an identity of user 104, but also an object that is not even visible to user 104 (e.g., there is no visibility into the existence of the object in the three-dimensional scene). Furthermore, in the view 116 of the three-dimensional scene provided by the display of the head-mounted display device 108 to user 104, the second wall frame on the right of the room wall is populated with content 120 (e.g., an image of another person) based on an identity of the user 104.

Accordingly, the example illustrated in FIG. 1 shows how a creator of (i) an experience, (ii) a three-dimensional scene that is part of an experience, and/or (iii) an object to be rendered for display in the three-dimensional scene that is part of the experience, can restrict the display of content based on user identity. That is, a head-mounted display device, or a device connected to the head-mounted display device, can be configured to cause a user identity of a user consuming a three-dimensional scene to be compared to information that defines user permissions associated with an object in the three-dimensional scene that has been designated for restriction. The user permissions indicate whether a user is allowed to view content of an object or is restricted from viewing the content of the object when consuming the three-dimensional scene. Accordingly, different users that consume the same three-dimensional scene authored for the same experience are presented with different content based on different user permissions.

In various examples, a head-mounted display device can compare a user identification to a list of user identifications associated with an object that is designated for restricted viewing. If the user identification is included on the list of user identifications, then the user is authorized to view the content of the object (e.g., the list is an "authorized" list of user identifications). For instance, the list can be an access control list maintained in association with the object by a network provider (e.g., a content or service provider that stores the object data). In other examples, if the user identification is included on the list of user identifications, then the user is not authorized to view the content of the object (e.g., the list is a "prohibited" list of user identifications). In even further examples, a head-mounted display device can compare a level of authentication associated with the user identification (e.g., based on a class of an employee, a type of customer, etc.) to a threshold level of authentication associated with the object or some sort of predefined condition for authorization. If the level of authentication associated with the user satisfies the threshold level of authentication or the predefined condition, then the user is authorized to view the content of the object.

As described above, the information that defines the user permissions can be metadata associated with an object. In some examples, the information can be accessed using a widget associated with an object. Thus, the widget can be embedded in, or part of, a three-dimensional scene. As part of the rendering process of the three-dimensional scene, a head-mounted display device, or a device connected to the head-mounted display device, can use the widget to retrieve data useable to render and display the content of the object. Moreover, the widget can be used to retrieve the metadata that defines user permissions.

In various examples, the user identification and/or the information that defines the user permissions can be accessed via an application programming interface (API) call to a service or an application configured to access the information that defines the user permissions. That is, when rendering the three-dimensional scene, a head-mounted display device can determine that an object is a restricted object. The object, or the widget associated with the object, can include data that indicates the object is a restricted object. Moreover, the object, or the widget associated with the object, can include data that indicates an owner of the object. Accordingly, the API call can be used to retrieve the user permissions from the owner of the object.

In some examples, a head-mounted display device can be configured provide an option for a viewing user to request permission to view content of a restricted object. For example, FIG. 1 illustrates a selectable control 122 associated with the wall frame on the right of the room wall. The user 102 can provide input to activate the selectable control 122, and based on this input, the head-mounted display device 106 can be configured to send a request to an owner of the object for user permission to view the content of the object.

Figure 2:
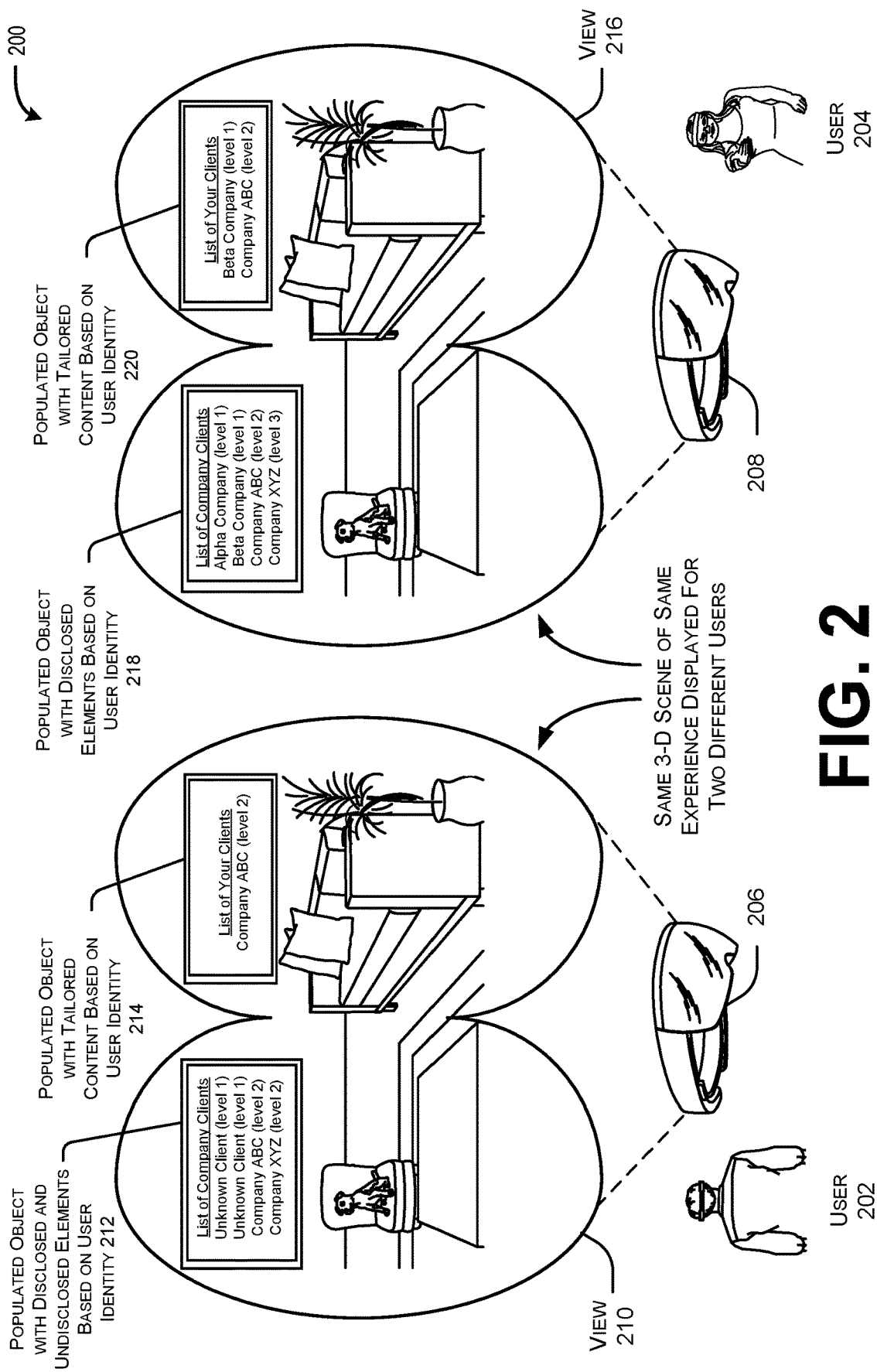
FIG. 2 is a diagram illustrating another example of how different users that enter a same experience and consume a same three-dimensional scene using respective head-mounted display devices are presented with different content (e.g., tailored content) based on their user identities.

FIG. 2 is a diagram 200 illustrating another example of how different users (e.g., a first user 202 and a second user 204) that enter a same experience and consume a same three-dimensional scene using respective head-mounted display devices 206, 208 are presented with different content (e.g., tailored content) based on their user identities. Similar to FIG. 1, the example three-dimensional scene in the diagram 200 of FIG. 2 includes a background template of a living room (e.g., walls, a floor, a couch, a chair, a coffee table, etc.). Moreover, a creator of the example three-dimensional scene has added objects to complete the three-dimensional scene. These objects include a plant and a dog. These objects have not been designated as objects configured to display tailored content based on user identities, and thus, the viewing of these objects by any user (e.g., user 202 and/or user 204) that consumes the three-dimensional scene illustrated in FIG. 2 is the same.

As illustrated, in a view 210 of the three-dimensional scene provided by a display of the head-mounted display device 206 to user 202, a first television screen on the left of the room wall is populated with content such as a list of company clients. The list of company clients may include some individual clients that are confidential and to which some people likely to consume the three-dimensional scene are not privy. Thus, the first television screen on the left of the wall comprises an object that has been designated as a tailored object. In the view 210, this object has been populated yet some of the elements of the object are not fully disclosed (e.g., confidential information is hidden from view) based on an identity 212 of user 202. For example, the identity of user 202 may allow him or her to view Company ABC and Company XYZ as clients of his or her employer, but the identity of user 202 does not allow him or her to view higher level (e.g., confidential) clients listed in the object. That is, user 202 may have clearance to view "level 2" clients as shown, but not "level 1" clients. Accordingly, the first television screen on the left of the wall is populated with content tailored to a user identity (e.g., some elements are disclosed and some elements are undisclosed or hidden).

Further in the view 210 of the three-dimensional scene provided by the display of the head-mounted display device 206 to user 202, a second television screen on the right of the room wall is populated with content such as a list of clients for which user 202 will be working. The second television screen on the right of the room wall also comprises an object that has been designated as a tailored object, and the object is populated with tailored content (e.g., user 202 will be working on Company ABC's account) based on a user identity 214.

The view 216 of the three-dimensional scene provided by a display of the head-mounted display device 208 to user 204 displays the same populated object in the form of the first television screen on the left of the room wall, but the object discloses the complete list of elements 218 such as company clients (e.g., no elements are undisclosed or hidden from view). For example, the identity of user 204 may allow him or her to view Alpha Company, Beta Company, Company ABC, and Company XYZ as clients of his or her employer. That is, user 204 is likely a higher level of employee than user 202 because user 204 has clearance to view "level 1" and "level 2" clients as shown, while user 202 is unable to view the names of the "level 1" clients—Alpha Company and Beta Company. Further in the view 216 of the three-dimensional scene provided by the display of the head-mounted display device 208 to user 204, the second television screen on the right of the room wall is populated with content such as a list of clients for which user 204 will be working. The second television screen on the right of the room wall also comprises an object that has been designated as a tailored object, and the object is populated with tailored content (e.g., user 204 will be working on the accounts of Beta Company and Company ABC) based on a user identity 220.

Similar to the discussion above, a widget associated with an object can be used to retrieve data useable to render and display tailored content of an object based on a user identity. Accordingly, a user identity and/or authorization credentials can be provided to a network provider that stores tailored content for an object. The network provider can be identified via a widget in the three-dimensional scene. The network provider can then determine and provide the tailored content based on the user identity. In some examples, the network provider can provide the tailored content to a class or a category of users. Thus, a user identification or other user information, can first be associated with a specific class or category of users. Consequently, a widget (e.g., a URL) can be used to pass along a user identification or a user category to a network provider, and the network provider is responsible for identifying the tailored content to be rendered and displayed based on the user identity or the user category.

Figure 3:
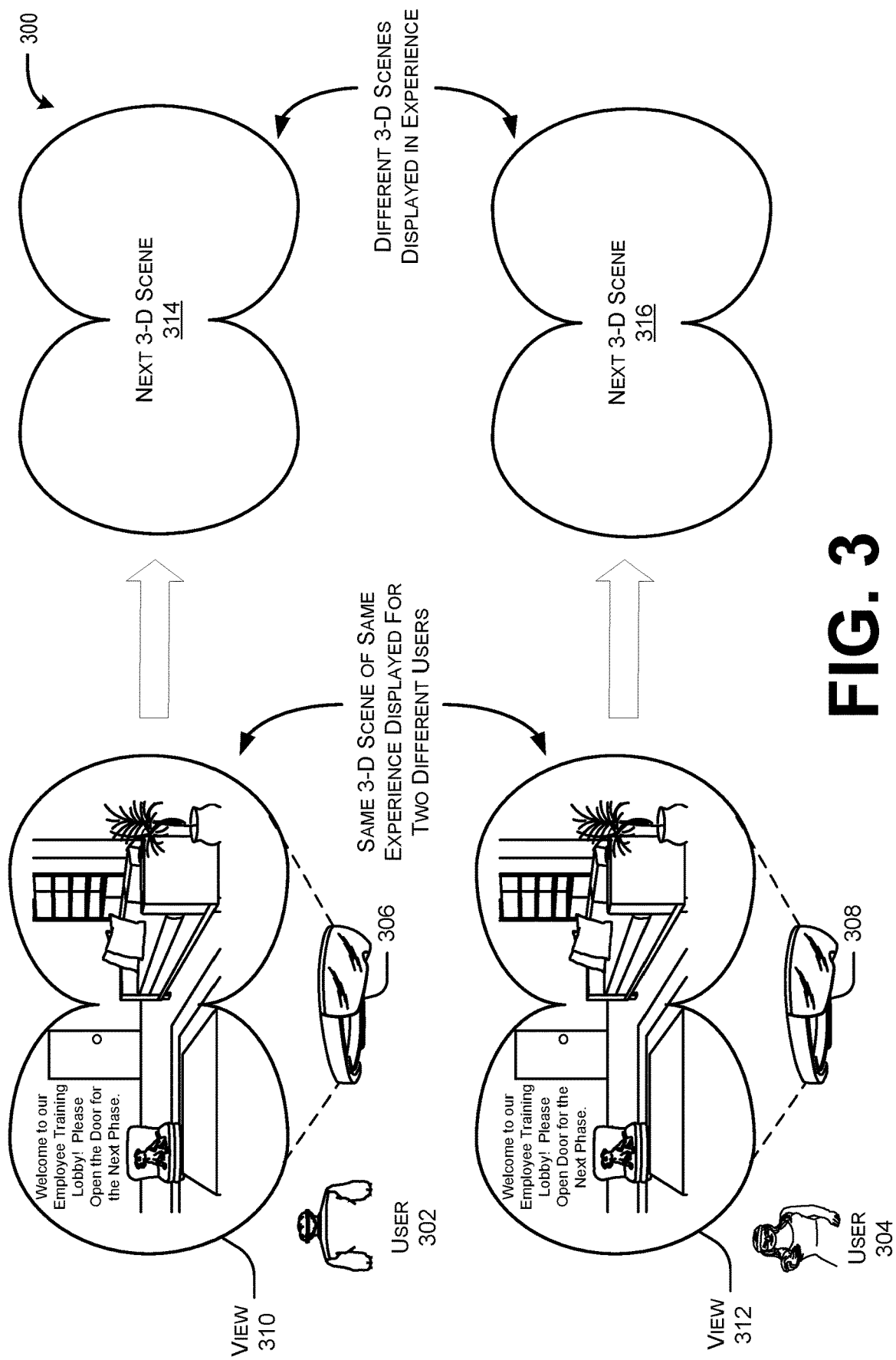
FIG. 3 is a diagram illustrating yet another example of how different users that enter a same experience using respective head-mounted display devices are presented with different content (e.g., different three-dimensional scenes) based on their user identities.

FIG. 3 is a diagram 300 illustrating yet another example of how different users (e.g., a first user 302 and a second user 304) that enter a same experience using respective head-mounted display devices 306, 308 are presented with different content (e.g., different three-dimensional scenes) based on their user identities.

In the example of FIG. 3, a user identification can be used to navigate from a current three-dimensional scene to a next three-dimensional scene. As illustrated via view 310 provided by head-mounted display device 306 and view 312 provided by head-mounted display device 308, both users 302 and 304 are viewing a same three-dimensional scene that states "Welcome to our Employee Training Lobby! Please open the door for the next phase." Continuing a previous example described, users 302 and 304 may be new employees of a company and the experience may be created for the new employees of the company.

The experience may be a unique experience for an individual user identity in the sense that after one or more three-dimensional scenes that are commonly viewed across different user identities, one or more next three-dimensional scenes may be user specific. Alternatively, the experience may be a unique experience for a group of users (e.g., new employees with a particular job title, new employees that are part of a specific department, etc.), and thus the one or more next three-dimensional scenes may be specific to a group of users.

Accordingly, when user 302 provides input to navigate from the currently displayed three-dimensional scene to a next three-dimensional scene (e.g., the input can be motion that represents the opening of the door and/or walking through the door), an identity of the user 302 can be used to identify a next three-dimensional scene 314. Similarly, when user 304 provides input to navigate from the currently displayed three-dimensional scene to a next three-dimensional scene, an identity of the user 304 can be used to identify a next three-dimensional scene 316 that is different when compared to the next three-dimensional scene 314. Consequently, the next three-dimensional scene may be identified and/or selected from a plurality of available next three-dimensional scenes, and therefore, different navigation paths in the same experience can be configured for different users.

In various examples, a view may be configured with a control to implement the switch between three-dimensional scenes. A "control" can comprise a displayed graphical user interface (GUI) element (e.g., a button, an object, etc.) that is activated based on an interaction between the GUI element and user input (e.g., a user selects or clicks on the GUI element). A control can alternatively be configured to accept and/or detect other forms of input such as a voice command or a gesture. Thus, a control may be configured to receive user input but may not necessarily be displayed as a GUI element. Consequently, user input to navigate, or switch, from one three-dimensional scene to the next can be based on an interaction with a displayed object. For instance, the user may employ user input devices such as a controller, a keyboard, a mouse, a pen, a voice input device, a touch input device, a gestural input device, a movement input device, etc. to select (e.g., click on, touch, walk through, etc.) the displayed object. The displayed object, in this example, is a door that serves as a link between the employee training lobby and the next phase of training for two different users (e.g., user 302 may be a newly hired salesperson and user 304 may be a newly hired engineer).

The examples provided above with respect to FIGS. 1-3 illustrate how a single experience can be created yet objects, content of objects, and/or three-dimensional scenes displayed to different users as part of the experience can be different. This enables a creator of the experience to protect confidential, sensitive, and/or private information from users that are not authorized to see such information. Moreover, this enables the creator of the experience to provide tailored content to a user or to a group of users that belong to a same class or category. Accordingly, during the creation process, a creator of the experience may define the information useable to display restricted and/or tailored content. For example, the creator of the experience may define a list of authorized or prohibited users. In another example, the creator of the experience may provide widgets that are used to populate objects with restricted and/or tailored content based on user identifications. Alternatively, a creator of an object may define the information useable to display restricted and/or tailored content.

Figure 4:
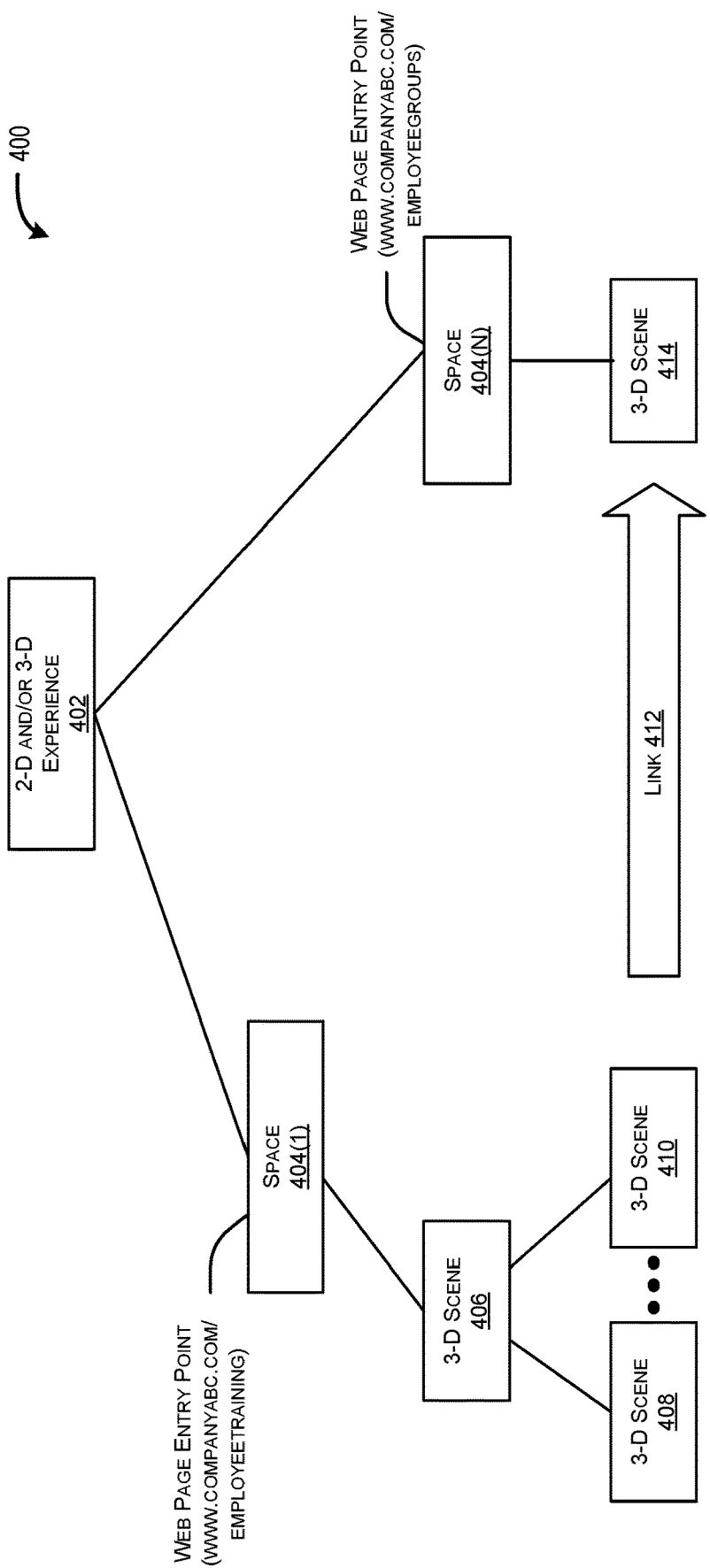
FIG. 4 is a diagram illustrating an example experience, of which three-dimensional scene(s) being consumed by a user can be a part.

FIG. 4 is a diagram 400 illustrating an example experience 402, of which three-dimensional scene(s) being consumed by a user can be a part. As shown, the experience 402 can include two-dimensional scenes and/or three-dimensional scenes. Generally, an experience 402 includes related and/or linked content that can be accessed and/or displayed for a particular purpose. As a specific example, the experience 402 can include company content an employer wants a new employee to know, to be informed about, or to learn, and thus, the new employee can access the experience 402 when he or she starts a new job. In another specific example, the experience 402 can include lesson content a school teacher wants a student to know, to be informed about, or to learn, and thus, the student can access the experience when he or she dives into a particular lesson. In accordance with these examples and others, the display of restricted and/or tailored content based on user identities can be implemented.

An experience 402 can include one or more spaces 404(1) through 404(N) (where N is a positive integer number such as one, two, three, four, and so forth). A space comprises a segment or type of content within the broader experience 402. There is no limitation how one segment or type of content can be distinguished from another segment or type of content in the same experience 402. Moreover, an experience may only include a single space. Continuing an example from above and to further illustrate, space 404(1) can include company content that relates to job training for a new employee, while space 404(N) can include company content related to different interest and activity groups for which the employer provides a budget (e.g., a hiking group, a skiing group, a chess group, a religious study group, etc.). The employer may have a policy to inform a new employee about these interest and activity groups when he or she starts a new job, so the new employee can join if a common interest is shared. This example shows how the two types of content relate to a situation where a new employee is beginning employment with a company, yet the types of content are different and therefore different spaces can be created and/or consumed within a broader experience 402.

As described above, a space can include three-dimensional scenes. In various implementations, an entry point for a user to consume a space can comprise a Web page or an Intranet page (e.g., a URL), accessed via a head-mounted display device or a computing device connected to the head-mounted display device. For instance, a new employee can visit "www.companyABC.com/employeetraining" on his or her computing device to enter space 404(1) that is part of the broader experience 402. The new employee can also visit "www.companyABC.com/employeegroups" on his or her computing device to enter space 404(N) that is part of the broader experience 402. In a specific example, space 404(1) may include a home page that displays two-dimensional content (e.g. text and a few images). This home page may include a first link to three-dimensional scene 406, which may contain links to three-dimensional scene 408 and three-dimensional scene 410. The three-dimensional scenes 406, 408, and 410 may also include links, or anchor points, that enable navigation to one another in a three-dimensional immersive environment. The new employee can consume the three-dimensional scenes 406, 408, and 410 in a three-dimensional immersive environment using a head-mounted display device. These three-dimensional scenes 406, 408, and 410, can also comprise URLs that are part of the Web page (e.g., "www.companyABC.com/employeetraining/3Dscene408" and "www.companyABC.com/employeetraining/3Dscene410"). Moreover, a scene 410 in a first space 404(1) can provide a link 412 (e.g., via the selection of a two-dimensional or three-dimensional object) to a three-dimensional scene 414 in a second space 404(N).

Accordingly, the consumption of three-dimensional scenes, as described herein, can be implemented as part of an experience 402 designed for a particular type of user (e.g., a new employee, a student of a class, etc.). In various examples, the experience 402 can be associated with one or more Web pages, yet aspects of the experience 402 can include, for example, one or more virtual reality (VR) three-dimensional scenes, one or more augmented reality (AR) three-dimensional scenes, and/or one or more mixed reality (MR) three-dimensional scenes. While the experience 402 shown in the example diagram 400 of FIG. 4 shows a limited number of spaces and scenes, it is understood in the context of this disclosure, that an experience can include any number of spaces (e.g., one, two, three, four, five, ten, twenty, one hundred) for related content and any number of scenes (e.g., one, two, three, four, five, ten, twenty, one hundred, etc.).

Figure 5:
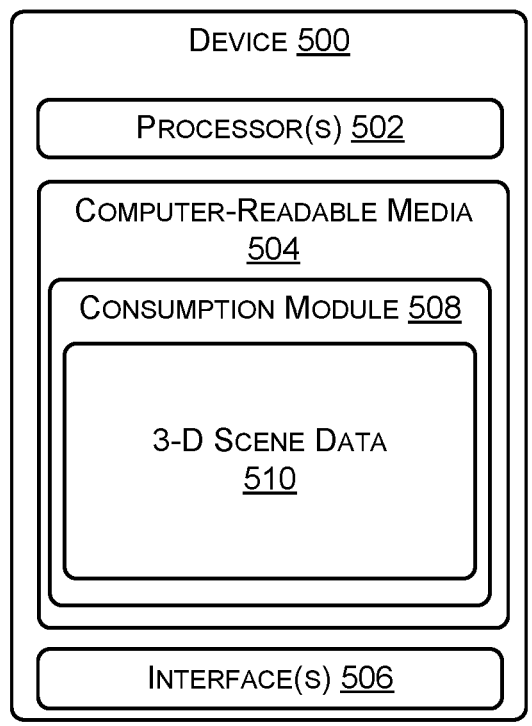
FIG. 5 is a diagram of an example device that can implement the techniques described herein.

FIG. 5 is a diagram of an example device 500 that can implement the techniques described herein. The device 500 can comprise a head-mounted display device or another device in communication with the head-mounted display device (e.g., a user device or a network device such as a server). For instance, the device 500 can include, but is not limited to: a game console, a desktop computer, a laptop computer, a gaming device, a tablet computer, a personal data assistant (PDA), a mobile phone/tablet hybrid, a telecommunication device, a network-enabled television, a terminal, an Internet of Things (IoT) device, a work station, a media player, or any other sort of computing device. Examples of a head-mounted display device include, but are not limited to: OCCULUS RIFT, GOOGLE DAYDREAM VIEW, MICROSOFT HOLOLENS, HTC VIVE, SONY PLAYSTATION VR, SAMSUNG GEAR VR, GOOGLE CARDBOARD, SAMSUNG HMD ODYSSEY, DELL VISOR, HP HEADSET, LENOVO EXPLORER, ACER HEADSET, ASUS WINDOWS MIXED REALITY HEADSET, or any augmented reality, mixed reality, and/or virtual reality devices.

Accordingly, in some instances, a head-mounted display device may not include a processor or computer-readable media. Rather, the head-mounted display device may comprise an output device configured to render data accessible via, and/or stored on, a connected computing device for display. For instance, the head-mounted display device may be tethered to the computing device. Therefore, interfaces of a computing device and a head-mounted display device can be configured to communicate via a wired and/or wireless Universal Serial Bus ("USB") connection, a BLUETOOTH connection, a High-Definition Multimedia Interface ("HDMI") connection, and so forth.

The may device 500 includes processor(s) 502 and computer-readable media 504. As used herein, a "processor" can represent, for example, a CPU-type processing unit, a GPU-type processing unit including a virtual GPU (VGPU), a field-programmable gate array (FPGA), a digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, "computer-readable media" can store instructions executable by a processor and/or data (e.g., model data for a scene, a template, or an object). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of memory included in a device and/or a hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

In some implementations, the device 500 includes input/output (I/O) interfaces that enable communications with input/output devices such as user input devices including peripheral input devices (e.g., a game controller, a keyboard, a mouse, a pen, a voice input device, a touch input device, a gestural input device, a motion input device, and the like) and/or output devices including peripheral output devices (e.g., a display screen, a printer, audio speakers, a haptic output device, and the like).

Device 500 also includes connection interfaces 506 that enable the device 500 to communicate over network(s) such as local area networks (LANs), wide area networks (WANs), satellite networks, cable networks, Wi-Fi networks, WiMax networks, mobile communications networks (e.g., 3G, 4G, and so forth), etc. In various implementations, connection interfaces 506 of a computing device and/or a head-mounted display device can be configured to operate in accordance with, and communicate over, a personal area network (PAN) that uses a wired and/or a wireless connection. For example, a PAN connection can operate in accordance with Infrared Data Association ("IrDA"), BLUETOOTH, wired and/or wireless USB, Z-Wave, ZIGBEE, or other short-range wireless technology.

The device 500 further includes a consumption module 508 that is configured to use three-dimensional scene data 510 to implement the techniques described herein. For example, the consumption module 508 may be a network-enabled application that provides the three-dimensional scene data 510 to a user device (e.g., a computing device, a head-mounted display device, etc.), over a network, for rendering and display. In another example, the consumption module 508 may be an application configured to retrieve, render, and/or display the three-dimensional scene data on a display of the head-mounted display device. The three-dimensional scene data 510 may include information (e.g. widgets) that provides access to restricted and/or tailored content (e.g., restricted and/or tailored objects).

The module provided in FIG. 5 is an example, and the number of modules used to implement the techniques described herein can vary higher or lower. That is, functionality described herein in association with the illustrated modules can be performed by a fewer number of modules or a larger number of modules on one device or spread across multiple devices.

Figure 6:
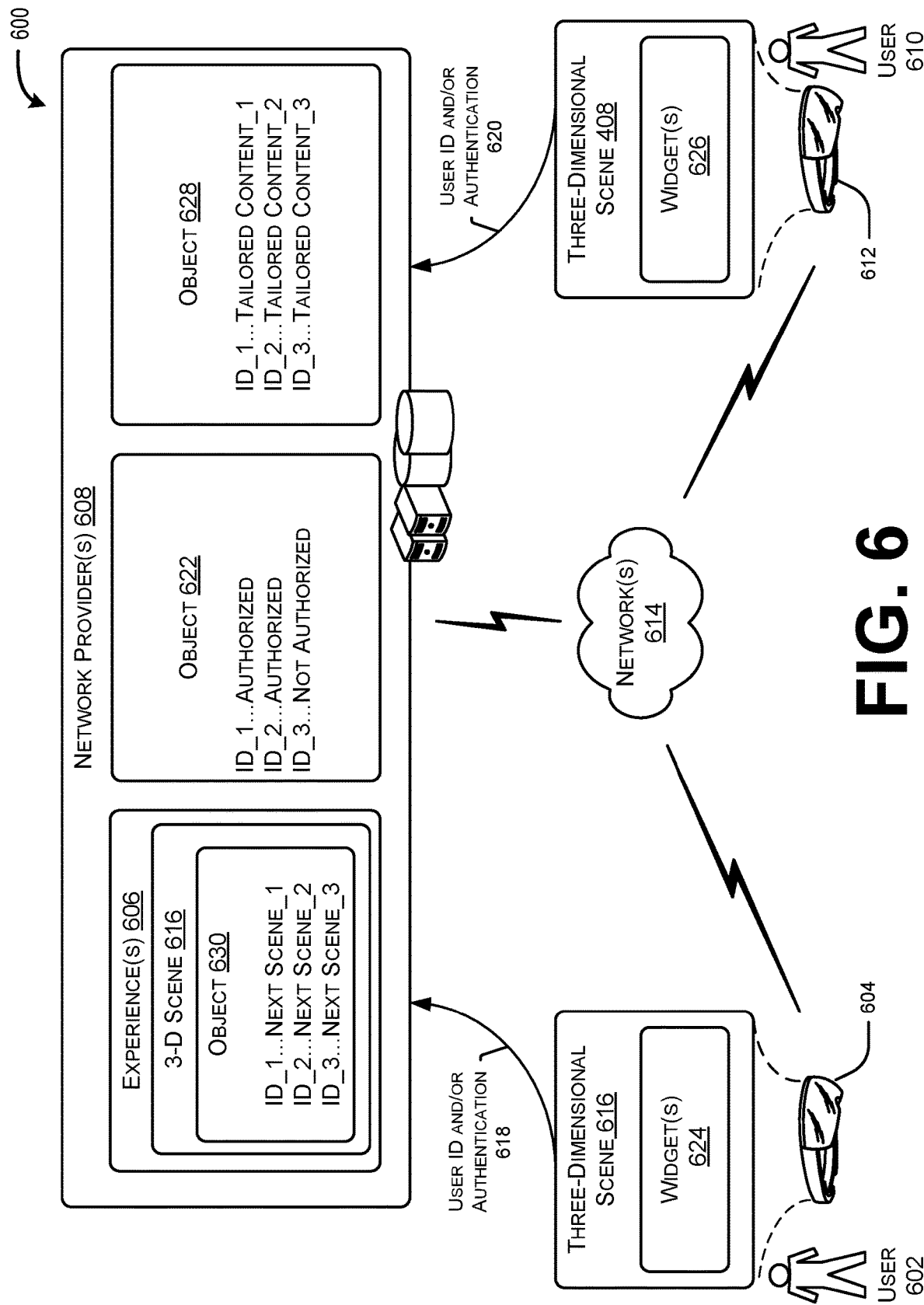
FIG. 6 is a diagram that illustrates an example of how network communications can be used to implement the techniques described herein.

FIG. 6 is a diagram 600 that illustrates an example of how network communications can be used to implement the techniques described herein. The diagram 600 illustrates a first user 602 that employs a head-mounted display device 604 to access and consume an experience 606 provided by network provider(s) 608 (e.g., content and/or service providers). Moreover, the diagram 600 illustrates a second user 610 that employs a head-mounted display device 612 to access and consume the same experience 606 provided by network provider(s) 608. Consequently, the experience 606 can be accessed, over network(s) 614, by the head-mounted display devices 604, 612. Alternatively, the experience can be accessed over network(s) 614 by user computing devices to which the head-mounted display devices 604, 612 are connected (e.g., via a USB connection).

As described above, the experience 606 can comprise a three-dimensional scene 616. In accordance with consumption of the experience 606, the identities of users 602, 610 are determined and/or authenticated 618, 620. Accordingly, three-dimensional scene(s) of the experience 606, such as three-dimensional scene 616, can be consumed using head-mounted display devices 604, 612.

In one example, the head-mounted display devices 604, 612 can identify an object 622 configured to be populated with restricted content when rendering the three-dimensional scene 616. The head-mounted display devices 604, 612 can be configured to access information that defines user permissions associated with the restricted object 622. For instance, widgets 624, 626 may enable the head-mounted display devices 604, 612 to access the information. As shown in FIG. 6, the object 622 includes a list of user identifications authorized to view the restricted content of the object 622 (e.g., ID_1 is authorized, ID_2 is authorized, etc.) and/or the object 622 includes a list of user identifications not authorized to view the restricted content of the object 622 (e.g., ID_3 is not authorized, etc.). Consequently, a network provider 608 is configured to provide the content of the object 622 for rendering if a corresponding user is determined to be authorized.

In another example, the head-mounted display devices 604, 612 can identify an object 628 configured to be populated tailored content when rendering the three-dimensional scene 616. The head-mounted display devices 604, 612 can be configured to access the tailored content for their respective users 602, 610. For instance, widgets 624, 626 may enable the head-mounted display devices 604, 612 to access the tailored content for the object 628 (e.g., widget 624 may locate a network provider 608 which identifies tailored content_1 for rendering and display of the object 628 to user 602, widget 626 may locate a network provider 608 which identifies tailored content_2 for rendering and display of the object 628 to user 610).

In yet another example, the three-dimensional scene 616 can be configured with a control (e.g., a selectable object 630) that is configured to identify a next three-dimensional scene from a plurality of available next scenes. Accordingly, when the control is activated, the network provider(s) can provide the head-mounted display devices 604, 612 with a next scene based on identities of users 602, 610.

Each of the examples described above enables different users consuming the same experience and/or the same three-dimensional scene to be provided with different content for viewing purposes.

Network(s), such as network(s) 614, can include, for example, public networks such as the Internet, private networks such as an institutional and/or personal intranet, or some combination of private and public networks. Network(s) can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) can utilize communications protocols, including packet-based and/or datagram-based protocols such as internet protocol (IP), transmission control protocol (TCP), user datagram protocol (UDP), or other types of protocols. Moreover, network(s) can also include a number of devices that facilitate network communications and/or form a hardware basis for the networks, such as switches, routers, gateways, access points, firewalls, base stations, repeaters, backbone devices, and the like.

In various implementations, network provider(s) 608 may be disparate entities. Consequently, an individual experience and/or an individual three-dimensional scene can include content that may have been designed by different developers and/or providers. To this end, an individual three-dimensional scene can include a list of widgets useable to render objects in the individual three-dimensional scene.

Figure 7:
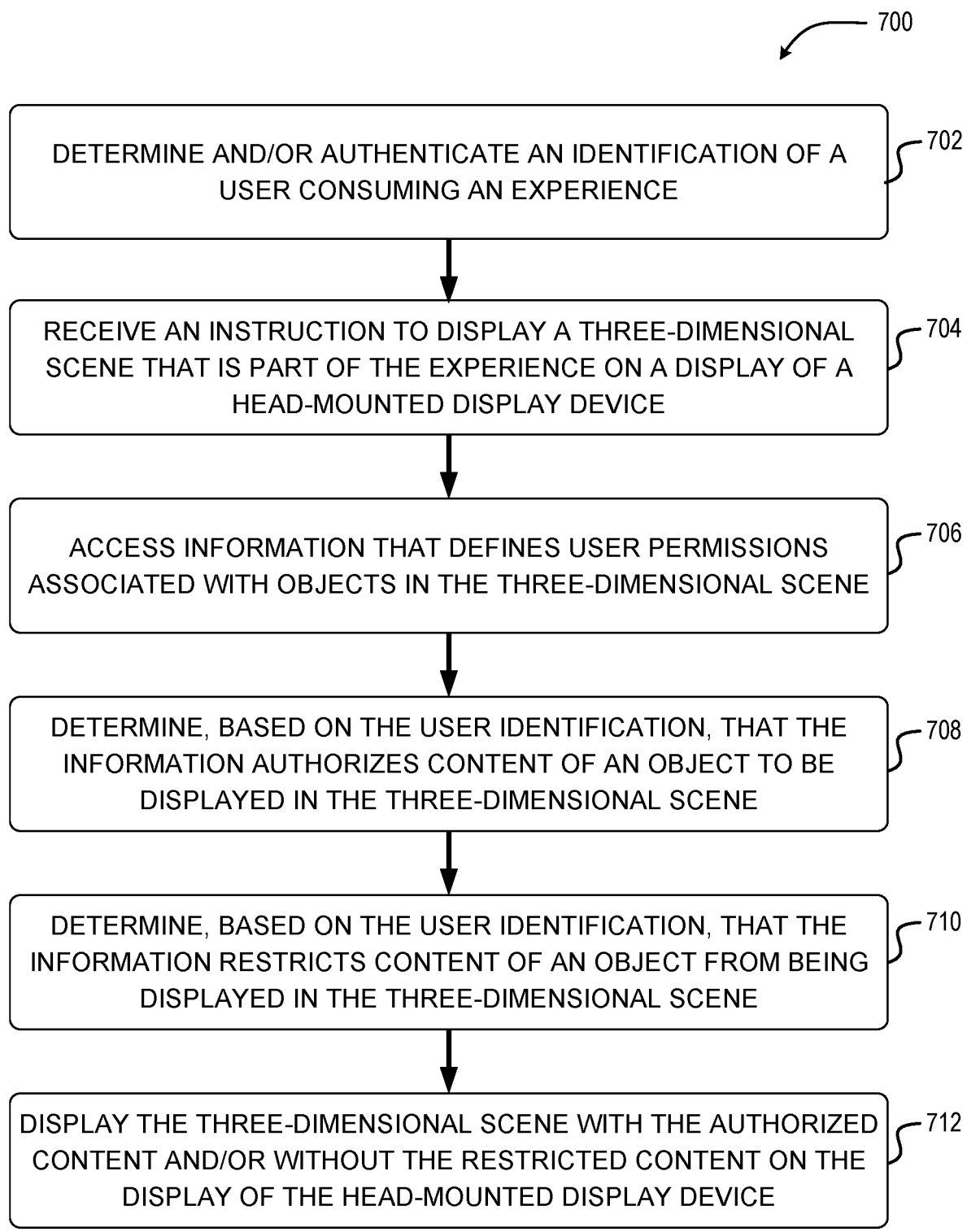
FIG. 7 is a diagram of an example flowchart that illustrates operations directed to determining whether restricted content can be rendered for display based on a user identity.
Figure 8:
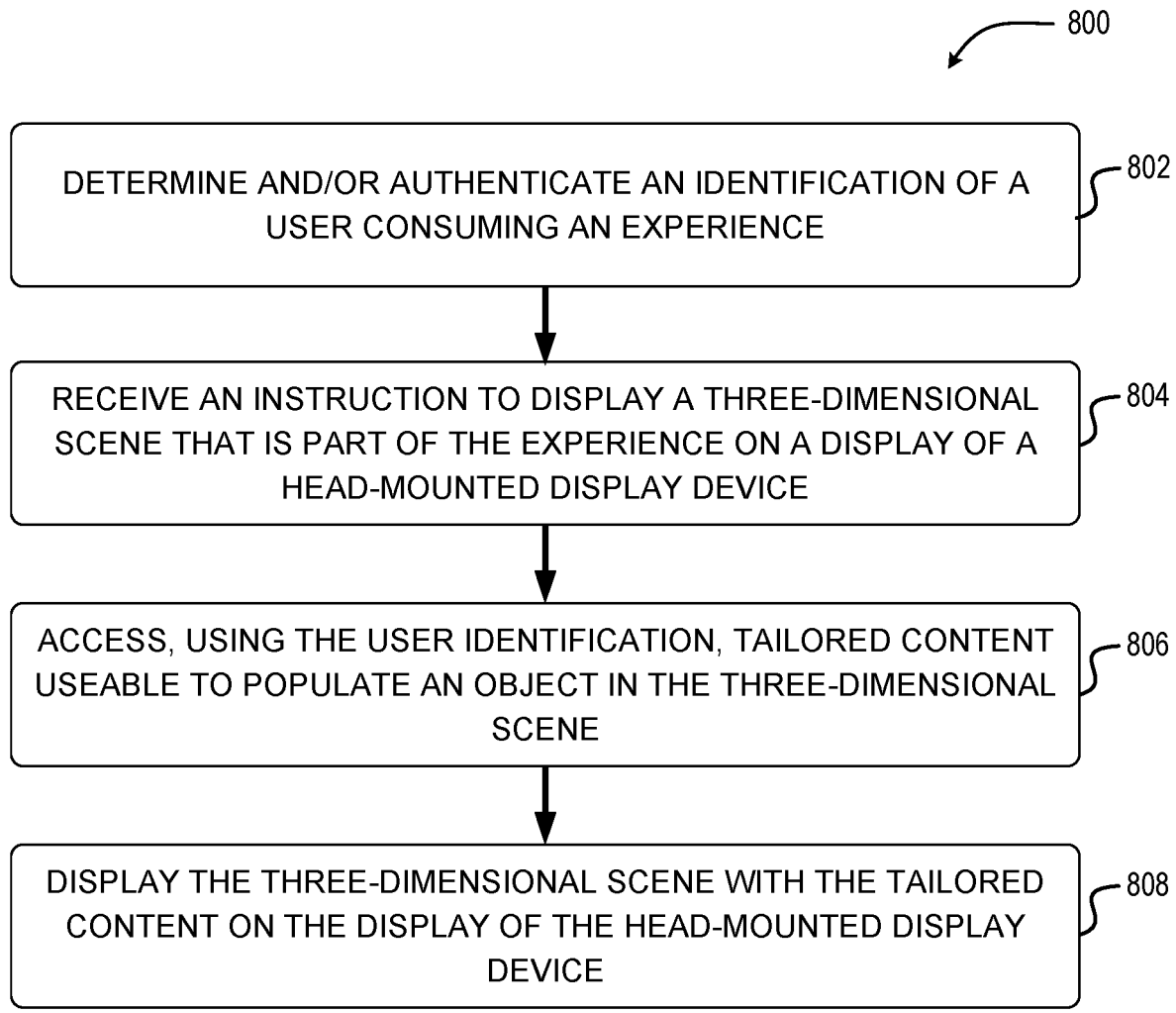
FIG. 8 is a diagram of an example flowchart that illustrates operations directed to rendering and displaying tailored content based on a user identity.
Figure 9:
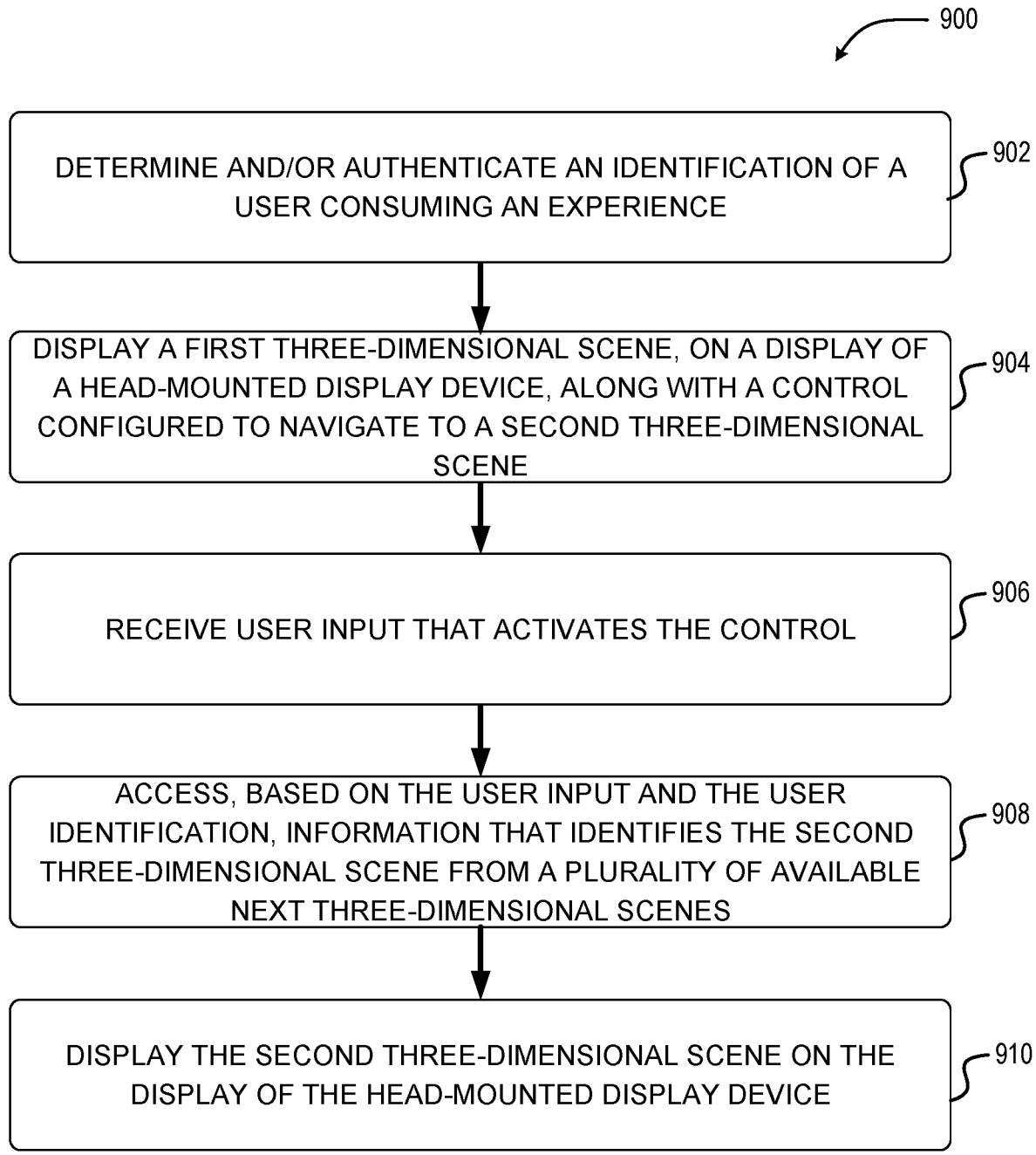
FIG. 9 is a diagram of an example flowchart that illustrates operations directed to rendering and displaying a tailored sequence of three-dimensional scenes based on a user identity.

FIGS. 7-9 each contains a flowchart of a method. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, wearable computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Additionally, the operations described herein can be implemented as a sequence of computer implemented acts or program modules running on a computing system (e.g., a device 500).

FIG. 7 is a diagram of an example flowchart 700 that illustrates operations directed to determining whether restricted content can be rendered for display based on a user identity. The operations in FIG. 7 can be performed by a head-mounted display device, by a computing device connected to the head-mounted display device, and/or by a network device.

At operation 702, an identification of a user consuming an experience is determined and/or authenticated.

At operation 704, an instruction to display a three-dimensional scene that is part of the experience on a head-mounted display device is received, the three-dimensional scene including one or more objects.

At operation 706, information that defines user permissions associated with the objects is accessed.

At operation 708, it is determined, based on the user identification, that the information authorizes content of an object to be displayed in the three-dimensional scene.

At operation 710, it is determined, based on the user identification, that the information restricts content of an object from being displayed in the three-dimensional scene.

At operation 712, the three-dimensional scene with the authorized content and without the restricted content is displayed on a display of the head-mounted display device.

FIG. 8 is a diagram of an example flowchart 800 that illustrates operations directed to rendering and displaying tailored content based on a user identity. The operations in FIG. 8 can be performed by a head-mounted display device, by a computing device connected to the head-mounted display device, and/or by a network device.

At operation 802, an identification of a user consuming an experience is determined and/or authenticated.

At operation 804, an instruction to display a three-dimensional scene that is part of the experience on a head-mounted display device is received, the three-dimensional scene including one or more objects.

At operation 806, the user identification is used to access tailored content useable to populate an object.

At operation 808, the three-dimensional scene with the tailored content is displayed on a display of the head-mounted display device.

FIG. 9 is a diagram of an example flowchart 900 that illustrates operations directed to rendering and displaying a tailored sequence of three-dimensional scenes. The operations in FIG. 9 can be performed by a head-mounted display device, by a computing device connected to the head-mounted display device, and/or by a network device.

At operation 902, an identification of a user consuming an experience is determined and/or authenticated.

At operation 904, a first three-dimensional scene that is part of the experience is displayed on a display of a head-mounted display device. The first three-dimensional scene is configured with a control to navigate to a second three-dimensional scene.

At operation 906, user input that activates the control is received.

At operation 908, information that identifies the second three-dimensional scene from a plurality of available next three-dimensional scenes is accessed based on the user input and the user identification.

At operation 910, the second three-dimensional scene that is part of the experience is displayed on the display of the head-mounted display device.

The disclosure presented herein may be considered in view of the following example clauses.

Example Clause A, a head-mounted display device comprising: a display; at least one processor; and memory storing instructions that, when executed by the at least one processor, causes the head-mounted display device to perform operations comprising: receiving an instruction to display a three-dimensional scene, wherein the three-dimensional scene includes at least a first object and a second object; accessing information that defines user permissions associated with the first object and the second object; determining, based at least in part on a user identification, that the information authorizes content of the first object to be displayed in the three-dimensional scene; determining, based at least in part on the user identification, that the information restricts content of the second object from being displayed in the three-dimensional scene; and displaying the three-dimensional scene on the display of the head-mounted display device, wherein the three-dimensional scene includes the content of the first object.

Example Clause B, the head-mounted display device of Example Clause A, wherein determining that the information authorizes the content of the first object to be displayed in the three-dimensional scene is based at least in part on the user identification being included on a list of user identifications that have permission to view the content of the first object.

Example Clause C, the head-mounted display device of Example Clause A, wherein determining that the information authorizes the content of the first object to be displayed in the three-dimensional scene is based at least in part on a level of authentication associated with the user identification satisfying a threshold level of authentication associated with the content of the first object.

Example Clause D, the head-mounted display device of any one of Example Clauses A through C, wherein restricting the content of the second object from being displayed comprises providing visibility into an existence of the second object in the three-dimensional scene.

Example Clause E, the head-mounted display device of any one of Example Clauses A through C, wherein restricting the content of the second object from being displayed comprises restricting visibility into an existence of the second object in the three-dimensional scene.

Example Clause F, the head-mounted display device of any one of Example Clauses A through E, wherein the information that defines the user permissions is accessed using a widget associated with the first object or the second object.

Example Clause G, the head-mounted display device of any one of Example Clauses A through E, wherein the information that defines the user permissions is accessed via an application programming interface call to an owner of the first object or the second object.

Example Clause H, the head-mounted display device of any one of Example Clauses A through G, wherein the operations further comprise: providing an option for a user to request permission to view the content of the second object; receiving user input that selects the option; and based at least in part on receiving the user input, sending a request to an owner of the second object for user permission to view the content of the second object.

While Example Clauses A through H are described above with respect to a device, it is understood in the context of this disclosure that the subject matter of Example Clauses A through H can additionally or alternatively be implemented as a method or via computer readable storage media.

Example Clause I, a head-mounted display device comprising: a display; at least one processor; and memory storing instructions that, when executed by the at least one processor, causes the head-mounted display device to perform operations comprising: receiving instructions to display a three-dimensional scene, wherein the three-dimensional scene includes an object; using a user identification to access tailored content useable to populate the object; and displaying the three-dimensional scene on the display of the head-mounted display device, wherein the three-dimensional scene includes the object populated with the tailored content.

Example Clause J, the head-mounted display device of Example Clause I, wherein the tailored content is accessed using a widget associated with the object, the widget comprising information that identifies a network location from which the tailored content can be retrieved based on the user identification.

Example Clause K, the head-mounted display device of Example Clause I, wherein the operations further comprise: associating the user identification with a category of users, wherein the tailored content is accessed using a widget associated with the object, the widget comprising information that identifies a network location from which the tailored content can be retrieved based on the category of users.

Example Clause L, the head-mounted display device of Example Clause J or Example Clause K, wherein the widget comprises a uniform resource locator.

Example Clause M, the head-mounted display device of Example Clause I, wherein the tailored content is accessed via an application programming interface call to an owner of the object, the application programming interface call including the user identification.

Example Clause N, head-mounted display device of any one of Example Clauses I through M, wherein the tailored content comprises at least one disclosed element and at least one undisclosed element.

Example Clause O, head-mounted display device of any one of Example Clauses I through N, wherein the object is populated differently based on different user identifications.

While Example Clauses I through O are described above with respect to a device, it is understood in the context of this disclosure that the subject matter of Example Clauses I through O can additionally or alternatively be implemented as a method or via computer readable storage media.

Example Clause P, a head-mounted display device comprising: a display; at least one processor; and memory storing instructions that, when executed by the at least one processor, causes the head-mounted display device to perform operations comprising: displaying a first three-dimensional scene on the display of the head-mounted display device, the three-dimensional scene configured with a control to navigate to a second three-dimensional scene; receiving user input that activates the control; accessing, based at least in part on the user input and a user identification associated with a user that provides the user input, information that identifies the second three-dimensional scene from a plurality of available next three-dimensional scenes; and displaying the second three-dimensional scene on the display of the head-mounted display device.

Example Clause Q, the head-mounted display device of Example Clause P, wherein the first three-dimensional scene, the second three-dimensional scenes, and the plurality of available next three-dimensional scenes are created as part of a same experience.

Example Clause R, the head-mounted display device of Example Clause P or Example Clause Q, wherein the control comprises an object displayed in the first three-dimensional scene and the information that identifies the second three-dimensional scene is accessed using a widget associated with the object.

Example Clause S, the head-mounted display device of Example Clause P, wherein the operations further comprise associating the user identification with a category of users, wherein the second three-dimensional scene is identified for the category of users.

Example Clause T, the head-mounted display device of Example Clause R, wherein the widget identifies a network provider that hosts an experience.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A head-mounted display device comprising:
   a display;
   at least one processor; and
   memory storing instructions that, when executed by the at least one processor, causes the head-mounted display device to perform operations comprising:
   accessing data associated with a single experience which includes a plurality of three-dimensional scenes configured to display related virtual content for a particular purpose, wherein the single experience enables a first user and a second user to navigate through a different sequence of three-dimensional scenes;
   displaying a first three-dimensional scene of the plurality of three-dimensional scenes on the display of the head-mounted display device, the first three-dimensional scene configured with a control to navigate to a second three-dimensional scene which is part of a group of available next three-dimensional scenes, wherein the control comprises an object displayed in the first three-dimensional scene;
   receiving, from the first user, user input that activates the control;
   accessing, based at least in part on the user input and a user identification associated with the first user, information that navigates the first user to the second three-dimensional scene, wherein the information that navigates the first user to the second three-dimensional scene is accessed using a widget associated with the object; and
   displaying the second three-dimensional scene on the display of the head-mounted display device.

2. The head-mounted display device of claim 1, wherein the widget identifies a network provider that hosts the single experience.

3. The head-mounted display device of claim 1, wherein the operations further comprise associating the user identification with a category of users, wherein the second three-dimensional scene is identified for the category of users.

4. A method comprising:
   accessing, by one or more processors, data associated with a single experience which includes a plurality of three-dimensional scenes configured to display related virtual content for a particular purpose, wherein the single experience enables a first user and a second user to navigate through a different sequence of three-dimensional scenes;
   displaying a first three-dimensional scene of the plurality of three-dimensional scenes on a display of a head-mounted display device, the first three-dimensional scene configured with a control to navigate to a second three-dimensional scene which is part of a group of available next three-dimensional scenes, wherein the control comprises an object displayed in the first three-dimensional scene;
   receiving, from the first user, user input that activates the control;
   accessing, based at least in part on the user input and a user identification associated with the first user, information that navigates the first user to the second three-dimensional scene, wherein the information that navigates the first user to the second three-dimensional scene is accessed using a widget associated with the object; and
   displaying the second three-dimensional scene on the display of the head-mounted display device.

5. The method of claim 4, wherein the widget identifies a network provider that hosts the single experience.

6. The method of claim 4, further comprising associating the user identification with a category of users, wherein the second three-dimensional scene is identified for the category of users.

7. A device comprising:

at least one processor; and memory storing instructions that, when executed by the at least one processor, causes the device to perform operations comprising:
- accessing data associated with a single experience which includes a plurality of three-dimensional scenes configured to display related virtual content for a particular purpose, wherein the single experience enables a first user and a second user to navigate through a different sequence of three-dimensional scenes;
- causing a first three-dimensional scene of the plurality of three-dimensional scenes to be displayed via a first head-mounted display device associated with a first user, the first three-dimensional scene displayed via the first head-mounted display device associated with the first user configured with a control that navigates the first user to one of a group of available next three-dimensional scenes, wherein the control comprises an object displayed in the first three-dimensional scene;
- causing the first three-dimensional scene of the plurality of three-dimensional scenes to be displayed via a second head-mounted display device associated with a second user, the first three-dimensional scene displayed via the second head-mounted display device associated with the second user configured with the control that navigates the second user to one of the group of available next three-dimensional scenes, wherein the control comprises the object displayed in the first three-dimensional scene;
- in response to input from the first user that activates the control:
  - accessing, based at least in part on a first user identification associated with the first user, information that navigates the first user to a second three-dimensional scene selected from the group of available next three-dimensional scenes; and
  - causing the second three-dimensional scene to be displayed via the first head-mounted display device associated with the first user; and
- in response to input from the second user that activates the control:
  - accessing, based at least in part on a second user identification associated with the second user, information that navigates the second user to a third three-dimensional scene selected from the group of available next three-dimensional scenes, wherein the third three-dimensional scene is different than the second three-dimensional scene; and
  - causing the third three-dimensional scene to be displayed via the second head-mounted display device associated with the second user.

* * * * *